(12) United States Patent
Herb et al.

(10) Patent No.: US 11,784,348 B2
(45) Date of Patent: Oct. 10, 2023

(54) ELECTROLYTES FOR MAGNESIUM-ION BATTERIES

(71) Applicant: The Trustees of Princeton University, Princeton, NJ (US)

(72) Inventors: Jake Herb, Princeton, NJ (US); Craig Arnold, Princeton, NJ (US); Carl Nist-Lund, Fort Myers Beach, FL (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 0 days.

(21) Appl. No.: 16/682,141

(22) Filed: Nov. 13, 2019

(65) Prior Publication Data

US 2020/0083565 A1    Mar. 12, 2020

Related U.S. Application Data

(62) Division of application No. 15/084,862, filed on Mar. 30, 2016, now abandoned.

(60) Provisional application No. 62/300,471, filed on Feb. 26, 2016, provisional application No. 62/140,599, filed on Mar. 31, 2015, provisional application No. 62/140,983, filed on Mar. 31, 2015.

(51) Int. Cl.
  *H01M 10/0568* (2010.01)
  *H01M 10/0569* (2010.01)
  *H01M 10/054* (2010.01)

(52) U.S. Cl.
  CPC ..... *H01M 10/0568* (2013.01); *H01M 10/054* (2013.01); *H01M 10/0569* (2013.01); *H01M 2300/0028* (2013.01)

(58) Field of Classification Search
  None
  See application file for complete search history.

(56) References Cited

U.S. PATENT DOCUMENTS

| | | | |
|---|---|---|---|
| 2,870,101 A * | 1/1959 | Stewart | C08G 65/08 528/410 |
| 3,657,361 A | 4/1972 | Lenz | |
| 3,920,713 A | 11/1975 | Feichtinger | |
| 3,946,102 A * | 3/1976 | Thomas | C01F 7/162 423/600 |

(Continued)

FOREIGN PATENT DOCUMENTS

| | | | |
|---|---|---|---|
| EP | 2824751 A1 | 1/2015 | |
| JP | 63-91392 | * 4/1988 | ............. C07F 5/06 |

OTHER PUBLICATIONS

Alfa Aesar product data sheet for Mg[Al(OCH(CH3)2)4]2, accessed at https://www.alfa.com/en/catalog/036591/ on Jan. 28, 2021 (Year: 2021).*

(Continued)

*Primary Examiner* — Amanda J Barrow
(74) *Attorney, Agent, or Firm* — MEAGHER EMANUEL LAKS GOLDBERG & LIAO, LLP (57) ABSTRACT

Disclosed is a class of organic salts and electrolytes, generally for use with electrochemical devices. Some of these salts enable the transport of magnesium ions without the presence of any additives, such as halide ions. Precursors are generated using simple fluorinated alcohols as well as abundant reagents. These precursors, often dissolved in ethereal solvents, may be combined with an appropriate Lewis acid to result in solutions that are able to conduct ions and allow for reversible electrodeposition.

3 Claims, 4 Drawing Sheets

(56) References Cited

U.S. PATENT DOCUMENTS

| | | | |
|---|---|---|---|
| 4,559,317 A | 12/1985 | Martin | |
| 4,837,190 A | 6/1989 | Summers | |
| 4,894,302 A * | 1/1990 | Hoffman | H01M 10/0568 |
| | | | 429/337 |
| 5,998,644 A * | 12/1999 | Kim | C07F 5/00 |
| | | | 556/28 |
| 6,221,941 B1 * | 4/2001 | Strauss | C07F 9/005 |
| | | | 524/176 |
| 8,354,193 B2 | 1/2013 | Muldoon | |
| 9,809,657 B2 * | 11/2017 | Wietelmann | C07C 41/26 |
| 2015/0056449 A1 | 2/2015 | Broughton, Jr. et al. | |
| 2015/0056499 A1 * | 2/2015 | Dai | H01M 10/054 |
| | | | 429/200 |
| 2016/0020485 A1 * | 1/2016 | Liao | H01M 10/0568 |
| | | | 429/337 |
| 2016/0039737 A1 * | 2/2016 | Champagne | C07C 67/475 |
| | | | 554/126 |
| 2017/0331154 A1 * | 11/2017 | Sato | H01M 10/0568 |

OTHER PUBLICATIONS

Goel et al., "Characterization of the products of the reactions of magnesium hydride with isopropylborate and aluminum isopropoxide in tetrahydrofuran," Inorganica Chimica Acta, 1982, 62, 161-166 (abstract provided). (Year: 1982).*

Atwood et al., "Mg[Al(OCH3)2(CH3)2)]2 • C4H8O2. A novel coordination compound of a metal alkoxide and donor molecule," J. Organometallic Chemistry, vol. 13, Issue 1, Jul. 1968, pp. 53-60 (abstract provided). (Year: 1968).*

Aurbach et al., Prototype systems for rechargeable magnesium batteries, Nature, vol. 407, Oct. 12, 2000, pp. 724-727 (Year: 2000).*

Gregory et al., "Nonaqueous Electrochemistry of Magnesium," J. Electrochem. Soc., vol. 137, No. 3, Mar. 1990, p. 775-780 (Year: 1990).*

Barbarich et al., Coordination of the new weakly coordinating anions Al(OCH(CF3)2)4-, Al(OC(CH3)CF3)2)4-, and Al(OC(Ph)CF3)2)4- to the monovalent metal ions Li+ and Tl+, Journal of Molecular Catalysis A: Chemical, vol. 128, Issues 1-3, Feb. 27, 1998, pp. 289-331 (Year: 1998).*

Aurbach, et al. "Prototype Systems for Rechargeable Magnesium Batteries" Letters to Nature, vol. 47, pp. 724-727, (Oct. 12, 2000).

Aurbach, et al. "Nonaqueous Magnesium Electrochemistry and Its Application in Secondary Batteries" The Chemical Record, Vo. 3, pp. 61-73, (2003).

Barile, et al. "Electolytic Conditioning of a Magnesium Aluminum Chloride Complex for Reversible Magnesium Deposition" The Journal of Physical Chemistry, vol. 118, pp. 27623-27630, (2014).

Barile, et al. "Investigating the Reversibility of in Situ Generated Magnesium Organohaloaluminates for Magnesium Deposition and Dissolution" The Journal of Physical Chemistry, vol. 118, pp. 10694-10699, (2014).

Belanger, et al. "Multidentate Lewis Acids: Synthesis and Structure of Complex Aluminum Chloride Alkoxides" Inorganic Chemistry, vol. 30, No. 22, (1991).

Bian, et al. "A Novel Thiolate-BASed Electrolyte System for Rechargeable Magnesium Batteries" Electrochimica Acta, vol. 121, pp. 258-263, (2014).

Gregory, et al. "Nonaqueous Electrochemistry of Magnesium: Applications to Energy Storage" Journal of Electrochemical Society, vol. 137, No. 3, (Mar. 1990).

Guo, et al. "Boron-BAsed Electrolyte Solutions with Wide Electrochemical Windows for Rechargeable Magnesium Batteries" Energy & Environmental Science, vol. 5, pp. 9100-9106, (2012).

Kim, et al. "Effect of Alkoxide Addition on the Electrochemical Deposition and Dissolution in Triglyme-Based Solution Dissolving Magnesium Bis(trifluormethanesulfonyl)amide" Journal of Power Sciences, vol. 278, pp. 340-343, (2015).

Kim, et al. "Structure and Compatibility of a Magnesium Electrolyte with a Sulphur Cathode", Nature Communications, vol. 2, No. 427, (2011).

Liao, et al. "Highly Soluble Alkoxide Magnesium Salts for Rechargeable Magnesium Batteries", Journal of Materials Chemistry A, vol. 2, pp. 581-584, (2014).

Liebenow, et al. "The Electrodisposition of Magnesium Using Solutions of Organomagnesium Halides, Amidomagnesium Halides and Magnesium Organoborates", Electrochemistry Communications, vol. 2, pp. 641-645 (2000).

Muldoon, et al. "Electrolyte Roadblocks to a Magnesium Rechargeable Battery", Energy & Environmental Science, vol. 5, pp. 5941-5950, (2012).

Nelson, et al. "Enhanced Oxidative Stability of Non-Grignard Magnesium Electrolytes through Ligand Modificaiton", Chemical Communication, vol. 10, (2014).

Nelson, et al. "A Magnesium Tetraphenylaluminate Battery Electrolyte Exhibits a Wide Electrochemical Potential Window and Reduces Stainless Steel Corrosion", Journals of Materials Chemistry A, vol. 2, pp. 18194-18198, (2014).

Noth, et al. "An Investigation of AlCl, Solutions in Ethers by Al NMR Spectroscopy" Zeitschrift fur Naturforschung, vol. 87b, pp. 29-37,(Jul. 22, 1981).

Overcash, et al. "The Electrodeposition of Magnesium" Transactions of the Electrochemical Society, vol. 64, pp. 305-311, (Sep. 9, 1933).

Rahim, et al. "Effects of Alkali and Alkaline Earth Metals on the Kolbe-Schmitt Reaction", Bulletin of the Chemical Society of Japan, vol. 75, No. 3, (2002).

Thoms, et al. "Magnesium Alcoholates as Precursors for Magnesia", Journal of Material Chemicals, vol. 5, No. 4, pp. 589-594, (1995).

Tutusaus, et al. "Paving the Way Toward Highly Stable and Practical Electolytes for Rechargeable Magnesium Batteries" Chem Electrochem Concepts, vol. 2, No. 51, (2014).

Wang, et al. "A Novel Electrolyte System without a Grignard Reagent for Rechargeable Magnesium Batteries", Chemical Communications, vol. 48, pp. 10763-10765, (2012).

Yoo, et al. "Mg Rechargeable Batteries: An On-going Challenge", Energy & Environmental Science, vol. 6, (2013).

Zechmann, et al. "Synthesis, Characterization, and Structural Study of Sterically Hindered Magnesium Alkoxide and Siloxide Compounds" Inorganica Chimica Acta, vol. 319, pp. 137-146, (2001).

Zechmann, et al. "Solvent Influences on the Molecular Aggregation of Magnesium Aryloxides: Synthesis, Crystal Structure, and Solution Characterization of Mg(OAr)2(L)3 (OAr=DMP, DIP, TCP) and [Mg(DIP02]3" Polyhedron, vol. 19, pp. 2557-2564, (2000).

Zhao-Karger, et al. "Bisamide Based Non-Nucleophilic Electrolytes for Rechargeable Magnesium Batteries" RSC Advances, vol. 3, 16330-16335, (2013).

Zhu, et al. "Halogen-Free Boron Based Electrolyte Solution for Rechargeable Magnesium Batteries", Journal of Power Sources, vol. 248, pp. 690-694, (2014).

LibreTexts, Section 5.3, "Polarity and Intermolecular Forces", accessed at https://chem.libretexts.org (copy provided, date unknown). (Year:2019).

Liao et al., Highly soluble alkoxide magnesium salts for rechargeable magnesium batteries Journal of Material Chemistry A, vol. 2, pp. 581-584, 2014.

Herb et al., "Structural Effects of Magnesium Dialkoxides as Precursors for Magnesium-ion Electrolytes", ECS Electrochemistry Letters, No. 4, vol. 6, A-49-A52, 2015.

* cited by examiner

ELECTROLYTES FOR MAGNESIUM-ION BATTERIES

CROSS-REFERENCE TO RELATED APPLICATIONS

This application is a divisional of U.S. patent Ser. No. 15/084,862, filed Mar. 30, 2016, and claims benefit of U.S. Provisional Application Nos. 62/140,599 and 62/140,983, both filed Mar. 31, 2015, and U.S. Provisional Application No. 62/300,471, filed Feb. 26, 2016 which are hereby incorporated in its entirety by reference.

BACKGROUND OF THE INVENTION

Nonaqueous magnesium ion batteries that use a metallic magnesium anode are attractive due to their high theoretical volumetric energy density and comparatively low cost of materials compared to lithium ion systems. Studies incorporating Grignard-based electrolytes for magnesium electrodeposition date back to the early twentieth century, but their use as electrolytes for magnesium batteries became of interest only as recently as 1990. Aurbach et al. studied electrolyte solutions that were synthesized by reacting an alkylmagnesium halide or a dialkylmagnesium species with a Lewis acid of general structure $R_xAlCl_{3-x}$. The complex species that result are capable of reversible magnesium electrodeposition, yet Barile et al. showed that these types of adducts decompose as a function of cycle count, based on NMR and GC-MS of the electrolyte and on SEM-EDS analysis of the electrodeposited metal. As such, the development of other, more suitable electrolytes for reversible magnesium electrodeposition is paramount.

BRIEF SUMMARY OF THE INVENTION

The present invention discloses a composition of matter represented by the formula $M(OR)_2$, wherein R is represented by the formula $CR_1R_2R_3$ and $R_1$, $R_2$, and $R_3$ independently represent a hydrogen atom, a halogen atom, or a substituted or non-substituted hydrocarbyl, haloalkyl or haloaryl group; wherein M is an alkaline earth metal; and wherein R is comprised of at least one hydrogen atom and at least one halogen atom.

Also disclosed is a composition of matter substantially represented by the formula $M1(M2R'_nR''_m)_2$, wherein n+m=4, M1 comprises an alkaline earth metal, M2 comprises a Group III metal, and R' and R'' are independently fluorinated or non-fluorinated moieties.

Also disclosed is an electrolyte precursor represented by the formula $MgR_2$, wherein R is a halogenated alkoxide.

A method for generating a precursor is also disclosed, involving combining a first material, comprising at least one of a magnesium dialkoxide, magnesium diaryloxide, magnesium metal, magnesium alloy, $Mg(OH)_2$, $MgH_2$, or any dialkyl magnesium species with a second material, comprising a halohydrin or a fluorinated alcohol. The precursor may also be combined with a secondary component to form an electroactive electrolyte.

A solvated electroactive electrolyte is also disclosed, comprising a solvated cation species, represented by the formula $MgR_2$, wherein R is a fluorinated or non-fluorinated moiety; an anion; and an ethereal solvent.

Further disclosed are electrochemical devices, comprising an anode; a cathode; and an electrolyte solution, wherein the electrolyte solution comprises either a solvated electroactive electrolyte, an electrolyte precursor, or a compound represented by the formula MR, wherein R is a halogenated alkoxide and M is an alkali metal.

DETAILED DESCRIPTION OF THE INVENTION

The present invention generally discloses an electrolyte or electrolyte precursors that enables reversible electrodeposition, including magnesium electrodeposition, and electrochemical devices that utilize these electrolytes or precursors.

More specifically, the invention discloses a composition of matter, represented by the formula $M(OR)_2$. R is comprised of at least one hydrogen atom and at least one halogen atom, and is represented by the formula $CR_1R_2R_3$. $R_1$, $R_2$, and $R_3$ independently represent a hydrogen atom, a halogen atom, or a substituted or non-substituted hydrocarbyl, haloalkyl or haloaryl group. M is an alkaline earth metal.

In one embodiment, the haloalkyl or haloaryl groups are fluoroalkyl or fluoroaryl groups. In another embodiment, R is a $C_1$-$C_{11}$ fluoroalkyl or fluoroaryl that is unsubstituted, or alternatively, substituted with one or more heteroatom linkers. In that embodiment, R is preferably a trifluoroethyl, hexafluoro-iso-propyl, or hexafluoro-2-phenyl-2-propyl group and derivatives thereof. In yet another embodiment, the preferred alkaline earth metal is magnesium.

Some examples of preferred embodiments include:

$Mg(TFE)_2$:

$Mg(HFIP)_2$:

and Magnesium 1,1,1,3,3,3-hexafluoro-2-phenyl-2-propoxide $[Mg(HFPh)_2]$:

One skilled in the art will recognize that, while the above examples illustrate variations of a preferred embodiment, similar embodiments utilizing other alkaline earth metals are envisioned.

The present invention also discloses a composition of matter, substantially represented by the formula $M1(M2R'_nR''_m)_2$, wherein n+m=4, M1 comprises an alkaline earth metal, M2 comprises a Group III metal, and R' and R" are independently fluorinated or non-fluorinated moieties. The fluorinated or non-fluorinated moieties include, but are not limited to alkyl, fluoroalkyl, alkoxy, fluoroalkoxy, hexamethyldisilazane (HDMS), or bis (trifluoromethane)sulfonimide (TFSI) moieties. One preferred embodiment utilizes Mg as M1 and Al as M2. In a more preferred embodiment, R' and R" are equivalent moieties. And in an even more preferred embodiment, R' and R" are equivalent fluoroalkoxy moieties.

The present invention also discloses an electrolyte precursor represented by the formula $MgR_2$, wherein R is a halogenated alkoxide. The halogenated alkoxide may be a fluorinated alkoxide, and more specifically, may be trifluoroethoxide, hexafluoro-iso-prop oxide, or hexafluoro-2-phenyl-2-propoxide. Thus, examples of these electrolyte precursors include, but are not limited to, $Mg(TFE)_2$, $Mg(HFIP)_2$, and $Mg(HFPh)_2$.

In another embodiment, the halogenated alkoxide is substantially represented by the formula $M1(M2R'_nR''_m)_2$, wherein n+m=4, M1 comprises an alkaline earth metal, M2 comprises a Group III metal, and R' and R" are independently fluorinated or non-fluorinated moieties. The fluorinated or non-fluorinated moieties include, but are not limited to alkyl, fluoroalkyl, alkoxy, fluoroalkoxy, hexamethyldisilazane (HDMS), or bis (trifluoromethane)sulfonimide (TFSI) moieties. One preferred embodiment utilizes Mg as M1 and Al as M2. In a more preferred embodiment, R' and R" are equivalent moieties. And in an even more preferred embodiment, R' and R" are equivalent fluoroalkoxy moieties.

Further disclosed is a method for generating an electroactive electrolyte. This method requires generating an electrolyte precursor. The method for generating a precursor is also disclosed, involving at least one of three reaction paths.

The first reaction path is to combining a first material, comprising at least one of a magnesium dialkoxide, magnesium diaryloxide, magnesium metal, magnesium alloy, $Mg(OH)_2$, $MgH_2$, or any dialkyl magnesium species with a second material, comprising a halohydrin or a fluorinated alcohol. The magnesium dialkoxide may include, but is not limited to, magnesium methoxide, magnesium ethoxide, magnesium isopropoxide, or magnesium tert-butoxide. The halohydrin may include, but is not limited to, trifluoroethanol, hexafluoro-iso-propanol, or hexafluoro-2-phenyl-2-propanol.

Although the invention is not limited to this embodiment, one preferred reaction scheme is: $Mg(OCH_3)_2+2ROH \rightarrow Mg(OR)_2+CH_3OH$. Typical parent starting alcohols may include numerous primary, secondary, or tertiary alcohols, which include but are not limited to the following: $CF_3CH_2OH$; $(CF_3)_2CHOH$; $(CF_3)_2COHPh$; $CFH_2CH_2OH$; $CF_3(CF_2)_nCH_2OH$, where n=1 to 9; $CF_3CHOHCH_2CH_3$; and $(CF_3)_nCH_{3-n}COH$, where n=1 or 2. Alternatively, diols, including hexafluoro-2,3-bis(trifluoromethyl)-2,3-butanediol, or polyether substituted fluoroalcohols, including $HOC(CF_3)_2CH_2(OCH_2CH_2)_2OMe$, may also be utilized.

Typically, these precursors are produced in the presence of a solvent such as toluene or an ethereal solvent, which may include, but is not limited to, tetrahydrofuran, dimethoxyethane, and higher order glymes, such as diglyme, triglyme, tetraglyme, or a combination of these materials.

The method for generating a precursor may also involve a recovery step. It may be possible to recover at least some alcohol resulting from the generation of the precursor. This material may then be used elsewhere if desirable; preferably, it would be recycled as a feed stream for generating additional precursors.

Example 1: Synthesis of $Mg(HFIP)_2$ Via $Bu_2Mg$

A solution of hexafluoroisopropanol (13.72 g, 2 eq) in THF (20 mL), was purged with argon, transferred to a second flask, and chilled to 0° C. Di-n-butylmagnesium (1M in heptane, 33.0 mL, 1 eq) was added dropwise via syringe to the chilled hexafluoroisopropanol solution; a white precipitate formed and gas was evolved. The reaction mixture was removed from the ice bath and stirred for 12 hours. The solvent was removed in vacuo, resulting in a residual white powder.

Example 2: Synthesis of $Mg(HFIP)_2$ from Mg Methoxide

A solution of 6-10 wt. % magnesium methoxide in methanol (30 mL, 1 eq) was added to a flask and the methanol was removed in vacuo. Anhydrous THF (20 mL) was added to the flask. Hexafluoroisopropanol (9.3 mL, 2.2 eq) was added to the flask, forming a clear, colorless solution. The solution stirred for 2 hours and filtered. The remaining solvent was removed in vacuo, and a residual white powder remained.

One skilled in the art will recognize that although these examples utilize magnesium as the alkaline earth metal, that other alkaline earth metals will function in a similar fashion, and these methods will produce analogous electrolytes and precursors using alternative alkaline earth metals.

The second disclosed reaction path for generating a precursor involves synthesis of a alkaline earth metal—Group III metal complex. A preferred embodiment is a magnesium species with an aluminum species. A more preferred embodiment is a magnesium fluorinated dialkoxide with a fluorinated aluminum alkoxide.

The second path can be substantially represented by the following equation: $M1R'_2+2M2R''_3 \rightarrow M1(M2R'_nR''_m)_2$, wherein n+m=4, M1 comprises an alkaline earth metal, M2 comprises a Group III metal, and R' and R" are independently fluorinated or non-fluorinated moieties, including but not limited to alkyl, fluoroalkyl, alkoxy, fluoroalkoxy, HDMS, or TFSI. A preferred embodiment utilizes Mg as M1 and Al as M2; the synthesis route is then $MgR'_2+2AlR''_3 \rightarrow Mg(AlR'R''_nR''_m)_2$, where n+m=4, and R' and R" are independently fluorinated or non-fluorinated moieties, including but not limited to alkyl, fluoroalkyl, alkoxy, fluoroalkoxy, HDMS, or TFSI. In a more preferred embodiment, R' and R" are equivalent moieties; the synthesis route is then $MgR_2+2AlR_3 \rightarrow Mg(AlR_4)_2$.

While not limited to such an embodiment, the alkalike earth metal reactant as used here is preferably formed utilizing the first reaction pathway described above. Similarly, while the Group III metal reactant does not require any specific synthesis route, preferred embodiments include but are not limited to:

Al(metal)+3R' $\rightarrow$ Al(R)$_3$

Al(metal)+3R' (in presence of amalgam, e.g., Ga—In eutectic) $\rightarrow$ Al(R)$_3$ Al(metal)+3R' (in presence of $I_2$) $\rightarrow$ Al(R)$_3$ Me$_3$Al+3R'→Al(R)$_3$ Al(OH)$_3$+3R'→Al(R)$_3$+3H$_2$O (removed by e.g. molecular sieves)

Where R is a fluoroalkoxide or fluoroaryloxide, including but not limited to trifluoroethoxide, hexafluoroisopropoxide (HFIP), or perfluorotertbutoxide, and R' is the fluorinated alcohol corresponding to R, including but not limited to trifluoroethanol, hexafluoroisopropanol, or perfluorotertbutanol.

One general equation utilizing this route to form magnesium aluminum complexes is Mg(OR)$_2$+2Al(OR)$_3$→Mg[Al(OR)$_4$]$_2$. While this reaction scheme utilizes a 1:2 stoichiometric ratio, other ratios are envisioned, including but not limited to a ratios of 1:1 or 1:3.

Example 3: Preparation of Al(HFIP)$_3$ from Trimethylaluminum

A solution of hexafluoroisopropanol (8 mL, 12.77 g, 4 eq) in THF (20 mL), was purged with argon, transferred to a second flask, and chilled to 0° C. Trimethylaluminum (2M in toluene, 9.5 mL, 1 eq) was added dropwise via syringe to the chilled hexafluoroisopropanol solution; vigorous gas evolution was observed. The reaction mixture was removed from the ice bath and stirred for 12 hours. The solvent was removed in vacuo, resulting in a white powder.

Example 4: Preparation of Several Mg(Al(OR)$_4$)$_2$ Solutions

Solutions of several of these adducts (ca. 0.25 M) were made by adding 2 mL of a pre-prepared Al(OR)$_3$ solution to a vial containing the Mg species. Electrolyte solutions were then stirred for a minimum of 24 hours, resulting in a clear and colorless solution.

The third reaction path can be substantially represented by the equation: 2M3M2R$_4$+M1X$_2$→M1(M2R$_4$)$_2$+2M3X, wherein X is a halogen, M1 comprises an alkaline earth metal, M2 comprises a Group III metal, M3 is an alkali metal, and R is a fluorinated or non-fluorinated moiety, including but not limited to alkyl, fluoroalkyl, alkoxy, fluoroalkoxy, HDMS, or TFSI. An example utilizing the third reaction pathway, which includes the formation of a Group III-alkali metal compound is as follows:

a)

b)

Where R is a fluorinated or non-fluorinated moiety.

The above described reactions can occur in appropriate solvents, generally leading to an electrolyte solution. Appropriate solvents include, but are not limited to: (1) ethereal solvents, including but not limited to tetrahydrofuran, dimethoxyethane, diglyme, triglyme, tetraglyme, or other Lewis basic solvents; or (2) carbonate esters, including but not limited to ethylene carbonate or dimethyl carbonate. In one embodiment, fluorinated aluminum alkoxides and aryloxides can be dissolved in ethereal solvents, and can then be combined with secondary components such as magnesium fluorinated alkoxides to result in solutions that are capable of reversibly electrodepositing magnesium metal on metallic substrates. Additionally, catalytic amounts of MgCl$_2$ or AlCl$_3$ can be added to activate the metal electrode and improve performance.

In one embodiment, halide-ion free electrolytes are produced through "green" chemistry, using this simple synthesis route. The starting materials are inexpensive and the two components are very easy to synthesize at scale.

The present invention also discloses a solvated electroactive electrolyte. This requires at least an anion, an ethereal solvent, and a solvated cation species represented by the formula MgR$_2$, wherein R is a fluorinated or non-fluorinated moiety, including but not limited to alkyl, fluoroalkyl, alkoxy, fluoroalkoxy, HDMS, or TFSI. In one embodiment, the fluorinated or non-fluorinated moiety is a halogenated alkoxide. In another embodiment, the anion comprises a species represented by the formula AlR'$_3$, wherein R' is a fluorinated or non-fluorinated moiety, including but not limited to alkyl, fluoroalkyl, alkoxy, fluoroalkoxy, HDMS, or TFSI.

The electroactive electrolyte is generally prepared by combining a precursor with a secondary component. Secondary components may include any material that reacts with the precursor to generate an electroactive electrolyte, which includes but is not limited to: Lewis Acids such as AlCl$_3$, MgCl$_2$; a solid surface, including materials comprising an anode or cathode, or a solid hydrocarbon, including but not limited to anthracene; and other elements, such as iodine.

Example 5: Preparation of Several MgR$_2$:AlCl$_3$ Solutions

Solutions of several of these adducts (ca. 0.25 M) were made by adding 2 mL of a pre-prepared AlCl$_3$ solution to a vial containing the Mg species.

Electrolyte solutions were then stirred for a minimum of 24 hours. If any solid precipitates formed from the reaction, the solution was filtered before use.

All magnesium dialkoxides and diaryloxides in this example are white, free flowing powders, and are safer to handle than traditional magnesium electrolyte precursors, which are typically pyrophoric liquids.

The magnesium fluorinated alkoxides are generally soluble in ethereal solvents, and become more soluble with the addition of a material such as AlCl$_3$.

Figure 1:
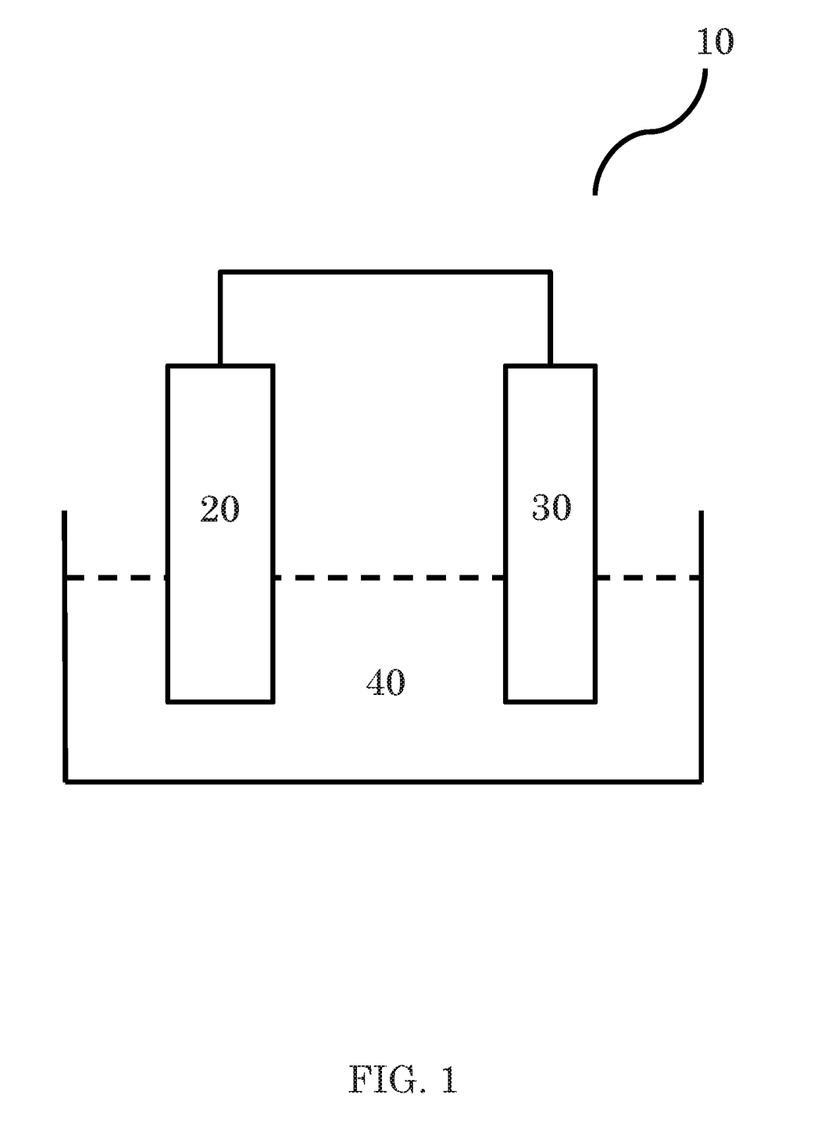
FIG. 1 is a diagram of one embodiment of an electrochemical device.

Further disclosed is an electrochemical device. As illustrated in FIG. 1, the device 10 generally requires an anode 20, a cathode 30, and an electrolyte solution 40. The composition of the electrolyte solution will typically involve a solvated electroactive electrolyte, such as those defined previously, although such is not required. The solution may instead comprise an electrolyte precursor, such as those defined previously. Alternatively, the solution may comprise a compound represented by the formula MR, wherein R is a halogenated alkoxide and M is an alkali metal, including but not limited to LiTFE or NaHFIP. It is expected that the electrolyte precursors and compounds represented by the formula MR may also be used as additives in electrolyte solutions.

Stabilizers can be added to improve performance within an electrochemical device. To stabilize an electrolyte solution, a quantity of a stabilizer can be added and combined with the electrolyte solution. Stabilizers are typically solid polycyclic aromatic hydrocarbons. In one embodiment, anthracene can be used as an activator and stabilizer for use in magnesium ion batteries, regardless of the composition of the electrolyte.

In addition to other uses, the electrochemical device may be configured to operate as a battery. As a battery, the cathode may comprise a variety of materials, but in a preferred embodiment, the cathode comprises at least one of elemental sulfur; a sulfur compound; a Chevrel-phase compound; a conversion type or an intercalation type compound, including conventional cathode materials such as $Mo_6S_8$. The anode may comprise magnesium metal or a magnesium-containing alloy. One exemplary electrochemical device comprises a magnesium anode, a $Mo_6S_8$ cathode, and an electrolyte solution comprising 0.5 M Mg, 1:1 Mg(hexafluoroisopropoxide)$_2$:AlCl$_3$.

Some embodiments of the electrochemical device exhibit high plating coulombic efficiency. Preferably, the device has an efficiency after 50 cycles that exceeds 90%, and more preferably, the efficiency after 100 cycles exceeds 95%.

Figure 3:
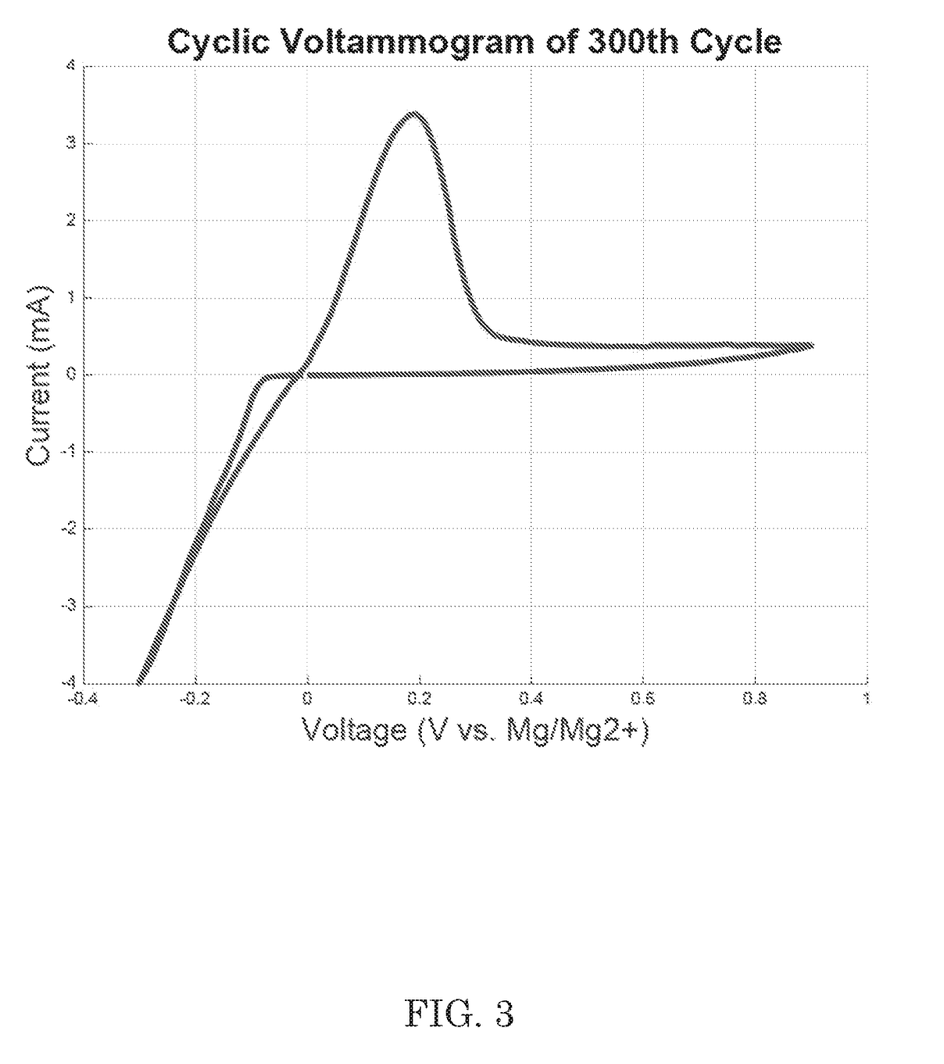
FIG. 3 is a representative cyclic voltammogram of an embodiment of an electrochemical device.

Measurement of the coulombic efficiency is performed by running a cyclic voltammogram on a 2032 coin cell using an Mg anode, copper or platinum cathode, and a separator. The voltammogram starts at 0 V, scans to ca. −0.5 V, scans to 1 V, and returns back to 0 V. This constitutes one cycle, and the process is performed at 10 mV/s. A representative voltammogram of the 300$^{th}$ cycle of one embodiment of the present invention is shown in FIG. 3. The efficiency is calculated by taking the integral of the oxidative stripping peak divided by the integral of the reductive plating peak and multiplying by 100. This process is performed using a potentiostat at room temperature in an inert atmosphere.

One exemplary device comprises a magnesium anode, a platinum cathode, and an electrolyte solution comprising 0.5 M, 1:1 Mg(HFIP)$_2$:AlCl$_3$. This device exhibits a 200 mV plating overpotential, and a 98% plating coulombic efficiency at 10 cycles and maintains that efficiency for at least 100 cycles.

Figure 2:
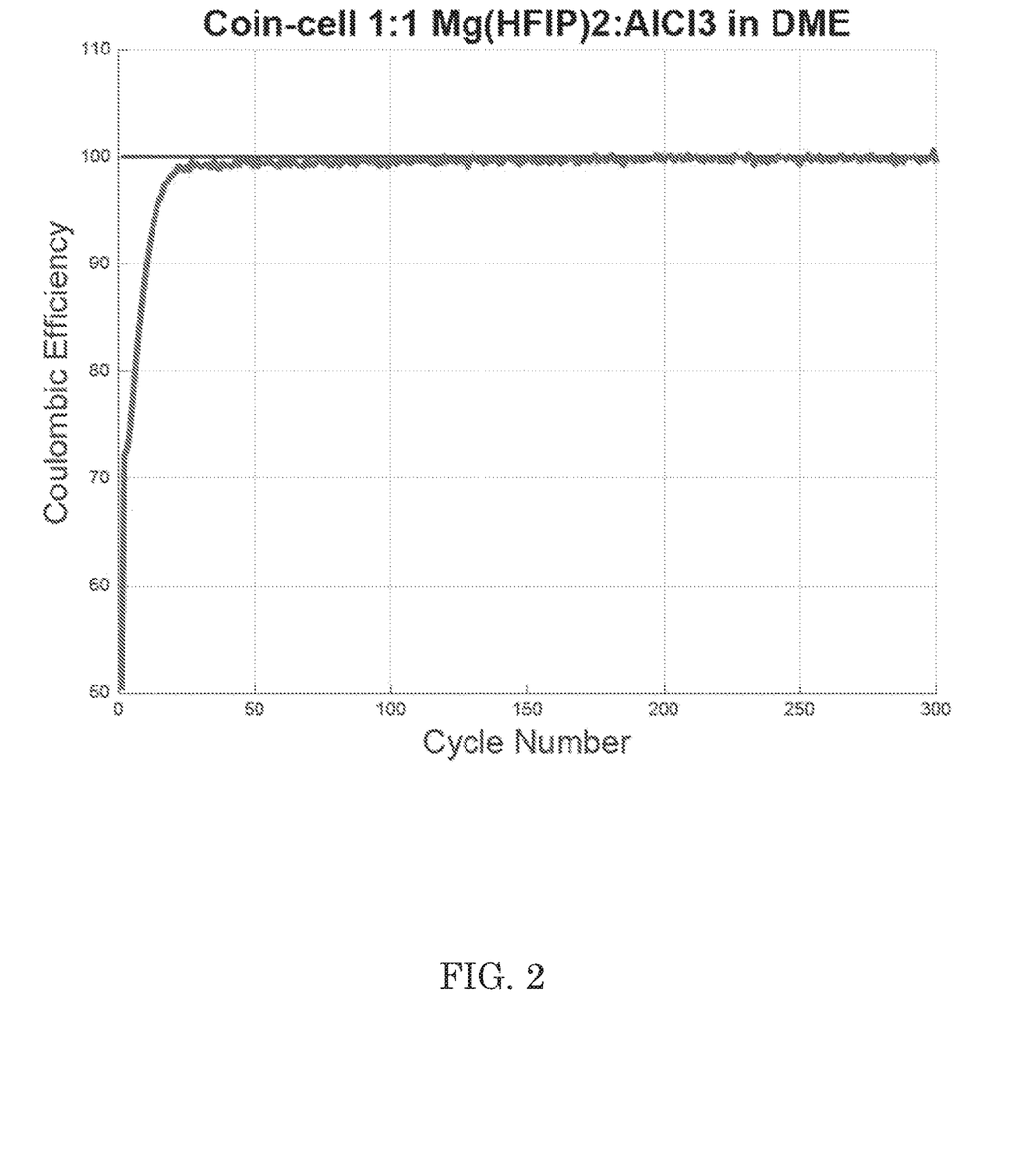
FIG. 2 is a graph of coulombic efficiency versus number of cycles for an embodiment of an electrochemical device.

Another exemplary device uses the same solution described above, but utilizes a copper cathode, a magnesium anode, and a separator. This device exhibits a plating overpotential of 200 mV, and as shown in FIG. 2, approximately 100% plating efficiency after 25 cycles, maintaining that level of efficiency for the remainder of the test period.

Utilizing these electrolytes and precursors in certain concentrations can allow the electrolytic solution to exhibit a useful range of conductivities. In certain embodiments of the present invention, the conductivity of the device electrolyte ranges from about 3 mS/cm to about 10 mS/cm. One exemplary electrolyte solution comprising 0.25 M 1:1 Mg(HFIP)$_2$:AlCl$_3$ in DME has a conductivity of 5.3 mS/cm. Another exemplary electrolyte solution comprising 0.25 M 2:1 Mg(HFIP)$_2$:AlCl$_3$ in DME as a conductivity of 4.5 mS/cm. A third exemplary solution comprising 0.25 M 1:2 Mg(TFE)$_2$:AlCl$_3$ in DME has a conductivity of 3.4 mS/cm. A fourth exemplary solution comprising 0.25 M 1:2 Mg(HFIP)$_2$:AlCl$_3$ in DME has a conductivity of 9.1 mS/cm.

It is well known that poor oxidative stability limits the types of cathode materials that can be used in a full battery cell. Generally, the oxidative stability limit is defined as the onset of anodic current flow. Also disclosed are embodiments where the oxidative stability of the electrolyte solution ranges from about 2.5 V to about 3.5 V vs. Pt electrode. This measurement is accomplished by submerging a metal electrode (generally platinum, copper, stainless steel, and other relevant metals used in batteries) into an electrolyte solution. Magnesium foil is used as both a counter and reference electrode. Then, the voltage is swept from 0 V vs. Mg to more positive potentials, until the current density reaches 10 mA/cm$^2$. The voltage at which this current density is reached defines the oxidative stability limit. This process is performed using a potentiostat at room temperature in an inert atmosphere.

One exemplary electrolyte solution comprising 0.25 M 1:2 Mg(HFIP)$_2$:AlCl$_3$ in DME has an anodic stability limit of 2.78 V vs. Mg using a platinum working electrode. Another exemplary electrolyte solution comprising 0.25 M 1:2 Mg(TFE)$_2$:AlCl$_3$ in DME has an anodic stability limit of 3.22 V vs. Mg using a platinum working electrode.

Figure 4:
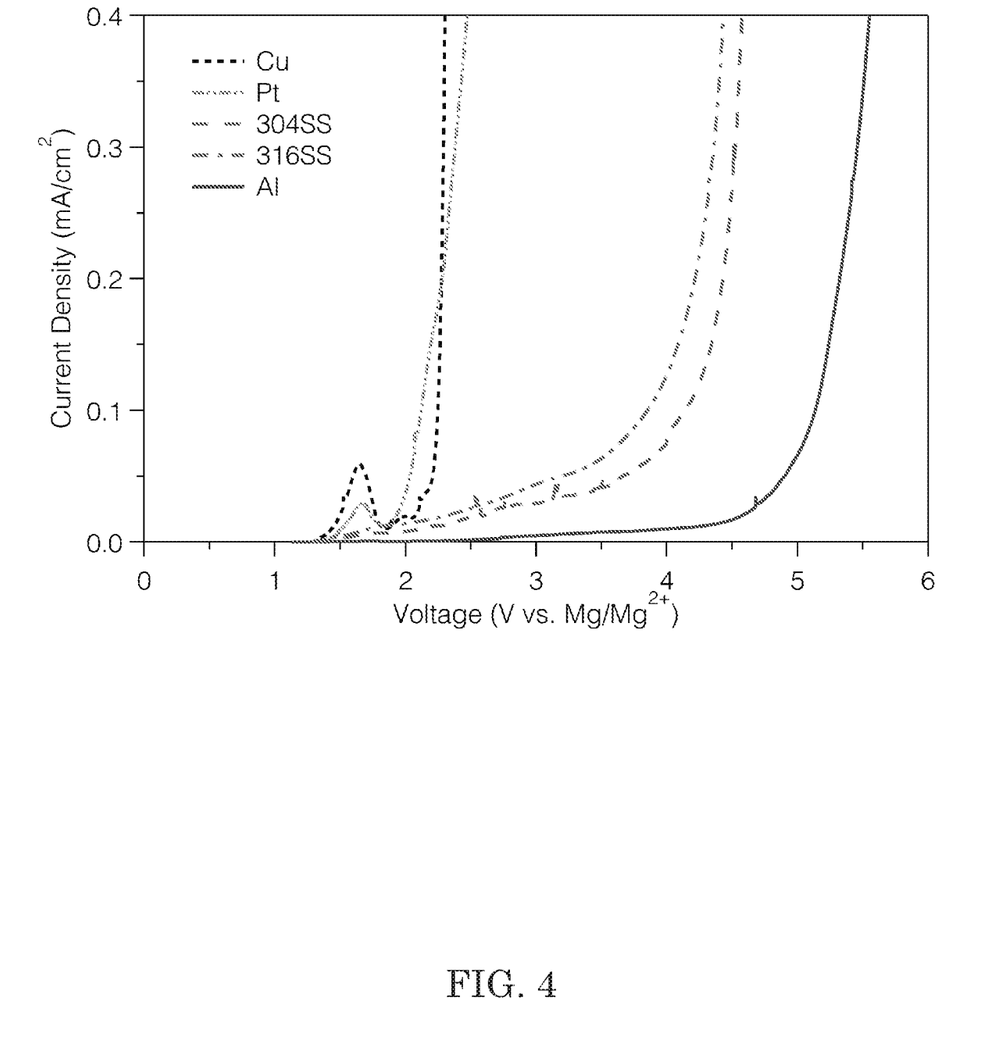
FIG. 4 is a graph of oxidative stability measured on a variety of different electrode materials

FIG. 4 discloses the oxidative stability of an electrolyte solution using a variety of different working electrodes. In FIG. 4, the electrolyte solution comprises 0.25 M 1:2 Mg(HFIP)$_2$:Al(HFIP)$_3$ in DME, and tests were run utilizing copper, platinum, aluminum, and 304 and 316 stainless steels working electrodes.

Various modifications and variations of the invention in addition to those shown and described herein will be apparent to those skilled in the art without departing from the scope and spirit of the invention, and fall within the scope of the claims. Although the invention has been described in connection with specific preferred embodiments, it should be understood that the invention as claimed should not be unduly limited to such specific embodiments.

What is claimed is:

1. A non-aqueous magnesium ion battery, comprising:
   an anode comprising magnesium or a magnesium-containing alloy;
   a cathode; and
   an electrolyte solution comprising:
     an ethereal solvent;
     an anion; and
     Mg(R)$_2$, where R is hexafluoroisopropoxide (HFIP), wherein a ratio of Mg(HFIP)$_2$ to the anion is 1:2;
     wherein the ethereal solvent is dimethoxyethane (DME); and
     wherein the anion is AlR'$_3$, where R' is hexafluoroisopropoxide (HFIP).

2. A non-aqueous magnesium ion battery, comprising:
   an anode comprising magnesium or a magnesium-containing alloy;
   a cathode; and
   an electrolyte solution comprising:
     an ethereal solvent;
     an anion; and Mg(R)$_2$, where R is hexafluoroisopropoxide (HFIP),
wherein a ratio of Mg(HFIP)$_2$ to the anion is 1:2;
wherein the ethereal solvent is dimethoxyethane (DME); and
wherein the anion is AlCl$_3$.

3. A non-aqueous magnesium ion battery, comprising:
an anode comprising magnesium or a magnesium-containing alloy;
a cathode; and
an electrolyte solution comprising:
  an ethereal solvent;
  an anion, the anion being AlCl$_3$; and
  Mg(R)$_2$, where R is hexafluoroisopropoxide (HFIP),
wherein the ethereal solvent is dimethoxyethane (DME);
wherein the anion is AlCl$_3$; and
wherein the electrolyte solution comprises 0.25 M 1:2 Mg(HFIP)$_2$:the anion in the ethereal solvent, and the electrolyte solution has an anodic stability limit of 2.78 V vs. Mg using a platinum working electrode.

* * * * *

UNITED STATES PATENT AND TRADEMARK OFFICE
CERTIFICATE OF CORRECTION

PATENT NO. : 11,784,348 B2
APPLICATION NO. : 16/682141
DATED : October 10, 2023
INVENTOR(S) : Jake Herb et al.

Page 1 of 1

It is certified that error appears in the above-identified patent and that said Letters Patent is hereby corrected as shown below:

In the Claims

Column 9, Line 12, delete the text ", the anion being A1C13"

Signed and Sealed this
Fourteenth Day of November, 2023

Katherine Kelly Vidal
*Director of the United States Patent and Trademark Office*